(12) United States Patent
Trivini

(10) Patent No.: US 8,312,595 B2
(45) Date of Patent: Nov. 20, 2012

(54) CASTOR WHEEL CONSTRUCTION FOR FURNITURE PIECES

(75) Inventor: Roggero Trivini, Sant'Angelo Lodigiano (IT)

(73) Assignee: O.G.T.M. Officine Meccaniche S.R.L., S. Angelo Lodigiano (LO) (IT)

( * ) Notice: Subject to any disclaimer, the term of this patent is extended or adjusted under 35 U.S.C. 154(b) by 120 days.

(21) Appl. No.: 12/924,341

(22) Filed: Sep. 24, 2010

(65) Prior Publication Data

US 2011/0203074 A1 Aug. 25, 2011

(30) Foreign Application Priority Data

Feb. 23, 2010 (IT) .............................. MI2010A0281

(51) Int. Cl.
*A47B 91/00* (2006.01)
*B60B 33/00* (2006.01)
(52) U.S. Cl. .......................................... 16/47; 16/35 R
(58) Field of Classification Search ................. 16/47, 48, 16/35 R, 35 D, 44, 31 R; 188/1.12, 29, 31, 188/69; 280/64, 65, 47.38, 47.39, 47.41
See application file for complete search history.

(56) References Cited

U.S. PATENT DOCUMENTS

| | | | | |
|---|---|---|---|---|
| 3,102,298 A | * | 9/1963 | Sheahan | 16/44 |
| 3,894,776 A | * | 7/1975 | Black | 301/64.706 |
| 4,351,084 A | * | 9/1982 | Fontana | 16/45 |
| 4,377,883 A | * | 3/1983 | Folson | 16/47 |
| 4,706,329 A | * | 11/1987 | Screen | 16/47 |
| 5,040,641 A | * | 8/1991 | Phillips et al. | 188/1.12 |
| 2005/0120514 A1 | * | 6/2005 | Donakowski | 16/45 |
| 2006/0032015 A1 | * | 2/2006 | Wyman | 16/45 |
| 2007/0062001 A1 | * | 3/2007 | Bushey et al. | 16/35 R |
| 2007/0186373 A1 | * | 8/2007 | Melara | 16/35 R |
| 2007/0289098 A1 | * | 12/2007 | Tsai | 16/35 R |
| 2008/0163455 A1 | * | 7/2008 | Tsai | 16/46 |

* cited by examiner

*Primary Examiner* — Chuck Y. Mah
(74) *Attorney, Agent, or Firm* — Hedman & Costigan, P.C.; James V. Costigan

(57) ABSTRACT

A castor wheel construction for furniture pieces and the like comprises a hub including an annular supporting element supporting a cylinder having two end portions thereon two wheels are respectively mounted, one for each cylinder portion, the annular supporting element also including a vertical attachment portion for receiving a peg element integral with the furniture pieces, to allow the castor wheel construction to turn about a vertical axis, each wheel comprising a cylindric portion operating as a tread, coupled to a flange portion, the wheels being fixedly coupled to the cylindric portion.

3 Claims, 6 Drawing Sheets

CASTOR WHEEL CONSTRUCTION FOR FURNITURE PIECES

BACKGROUND OF THE INVENTION

The present invention relates to a castor wheel construction, particularly designed for furniture pieces and the like.

As is known, swinging or castor wheels are conventionally used for allowing furniture pieces such as chairs, tables, desks and carriages, as well as shop trolleys, to be easily handled.

Prior castor wheels may be classified as included substantially into two classes, that is a single wheel type or a double wheel element type.

In a single wheel element castor wheel, a single wheel element has a rotary axis cooperating with a support element which, in turn, is clamped or connected to a furniture piece or a trolley, by a vertically extending connecting pin.

This connecting pin allows the castor wheel to rotate about a substantially vertical axis, thereby allowing the furniture piece or trolley to be driven in any desired direction.

The individual or single wheel element castor wheels have the disadvantage that they provide a resistance against a rotary movement of the wheel assembly about the vertical axis, thereby the movement of the furniture piece or trolley the wheel assembly is applied to cannot be considered an even movement.

Actually, for allowing the wheel assembly to be rotated about the vertical axis, the wheel element must be able of rotating about a line passing through the wheel element and its floor contacting point.

In fact, a peripheral portion of the wheel element tends to slip on the floor, instead of freely rotating.

Moreover, the wheel element central rotary axis is clamped outside of the wheel element by clamping or support members which are not protected with respect to possible impacts against articles such as other furniture pieces or walls.

Such an impact could damage the wheel assembly axis, thereby decreasing the operating efficiency of the wheel assembly, or making a proper operation impossible.

The double wheel element systems, on the other hand, provide to use two wheel elements having a shared rotary axis which is fixed to the wheel assembly support element at an intermediate position between the two wheel elements, which are free of separately rotating.

Thus, the wheel elements may also rotate in mutually opposite directions, thereby facilitating the overall rotary movement of the wheel assembly about the vertical rotary pin fixing the wheel assembly to the furniture piece or trolley, and greatly improving the evenness of movement and the direction changing capability.

Moreover, in the double wheel element system, the wheel element axis support is arranged at the center of the support assembly and between the two wheel elements for protecting them from possible impacts and damages, thereby causing a consequent driving efficiency decrease.

A main problem of the above two wheel element assembly is that of properly clamping the wheel elements to the central axis.

Differently from the first class wheel assemblies, in which the central axis is coupled to the two opposite faces of the wheel element, in the double wheel element system, each wheel element is respectively connected to an opposite end portion of the central axis, with the axis support arranged between the two wheel elements.

This connecting or clamping system is not efficient as desired, since it has a very low stability: in fact, since the axis does not pass through the wheel element, the wheel element load on said axis is an asymmetrical one, and being maximum near the wheel element inner part joined to the axis and minimum, or zero, outside of the wheel element.

Such instability generates, as it should be easily apparent from an examination of a wheel assembly of the second type, a great clearance between the wheel elements and central axis, which not only causes the wheel assembly to inefficiently operate, but which, moreover, negatively affects the aesthetic aspect of the overall furniture piece or trolley the wheel assembly is connected to.

Both the above disclosed castor wheel types, moreover, have further substantial drawbacks.

In fact, in both the above castor wheel types, the wheel element proper rotates about its rotary axis and the rotary movement is allowed owing to a very low friction coefficient between the wheel element and axis.

Since the diameter of the wheel element, with respect to the rotary axis engagement hole is a typically large one, then the torques operating on the axis-wheel coupling hole are correspondingly large.

Due to the above reasons, upon a long use of the wheel assembly, friction will progressively remove material from the hole thereby enlarging the latter, to provide an instable rotary movement on the wheel on its axis, with a consequent inefficient operation of the overall wheel assembly.

Moreover, in a condition in which the rotary of a wheel element is a comparatively slow one and the main function of the wheel element is that of supporting a comparatively large load, then the use of a central rotary axis does not constitute the most efficient approach.

In fact, during the rotary movement, the wheel elements transmit a torque about the line passing through the center of the wheel element and perpendicularly to the movement direction.

Such a torque is generated since the force applied on the wheel element at its floor contact point is multiplied time its distance for its rotary axis, that is the wheel element radius.

Such a torque provides an additional load on the wheel element/axis assembly, thereby further decreasing the operating stability of the overall wheel assembly.

So-called hubless castor wheels are also known.

In these hubless castor wheels, a supporting element comprises an inner annular portion thereabout a toroidal wheel element is caused to turn through an interposition of sliding elements.

These sliding elements, which may comprise sliding balls or rolls, are engaged in sliding recesses formed both on the annular inner portion and on the toroidal wheel inner part.

Thus, since they are frontally facing, they will hold inside the wheel assembly the sliding elements to allow the latter to properly operate.

From the above it occurs that, for making a hubless castor wheel, it is necessary to form the above mentioned recesses, with a comparatively high machining precision, causing in turn an increase of the making and selling cost of such a hubless castor wheel.

Moreover, in a long operation time, the sliding elements tend to damage the recessed contours to enlarge them, and correspondingly enlarging the clearance between the annular inner element and toroidal wheel, thereby decreasing the stability of the overall wheel assembly.

SUMMARY OF THE INVENTION

Accordingly, the aim of the present invention is to provide such a castor wheel construction overcoming all the above mentioned prior art drawbacks.

Within the scope of the above mentioned aim, a main object of the invention is to provide such a castor wheel construction which may be made by a more economic, quick and simple method than conventional methods.

Another object of the present invention is to provide such a castor wheel construction which does not require to use sliding elements, such as sliding bearings.

Yet another object of the present invention is to provide such a castor wheel construction which operates in a very efficient manner for a very long operating time.

Yet another object of the present invention is to provide such a castor wheel construction which, owing to its specifically designed structural features, is very reliable and safe in operation.

Another object of the present invention is to provide such a castor wheel construction which can be made starting from easily commercially available elements and materials and which, moreover, is very competitive from a mere economic standpoint.

According to one aspect of the present invention, the above mentioned aim and objects, as well as yet other, objects, which will become more apparent hereinafter, are achieved by a castor wheel construction for furniture pieces and the like, characterized in that said castor wheel construction comprises a hub including an annular supporting element supporting a cylinder having two end portions thereon two wheels are respectively mounted, one for each said cylinder portion, said annular supporting element also including a vertical attaching point for receiving a peg element integral with said furniture piece to allow said castor wheel construction to turn about a vertical axis, each said wheel comprising a cylindric portion operating as a tread, coupled to a flange portion, said wheels being fixedly coupled to said cylindric portion.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where.

DESCRIPTION OF THE PREFERRED EMBODIMENTS

Figure 1:
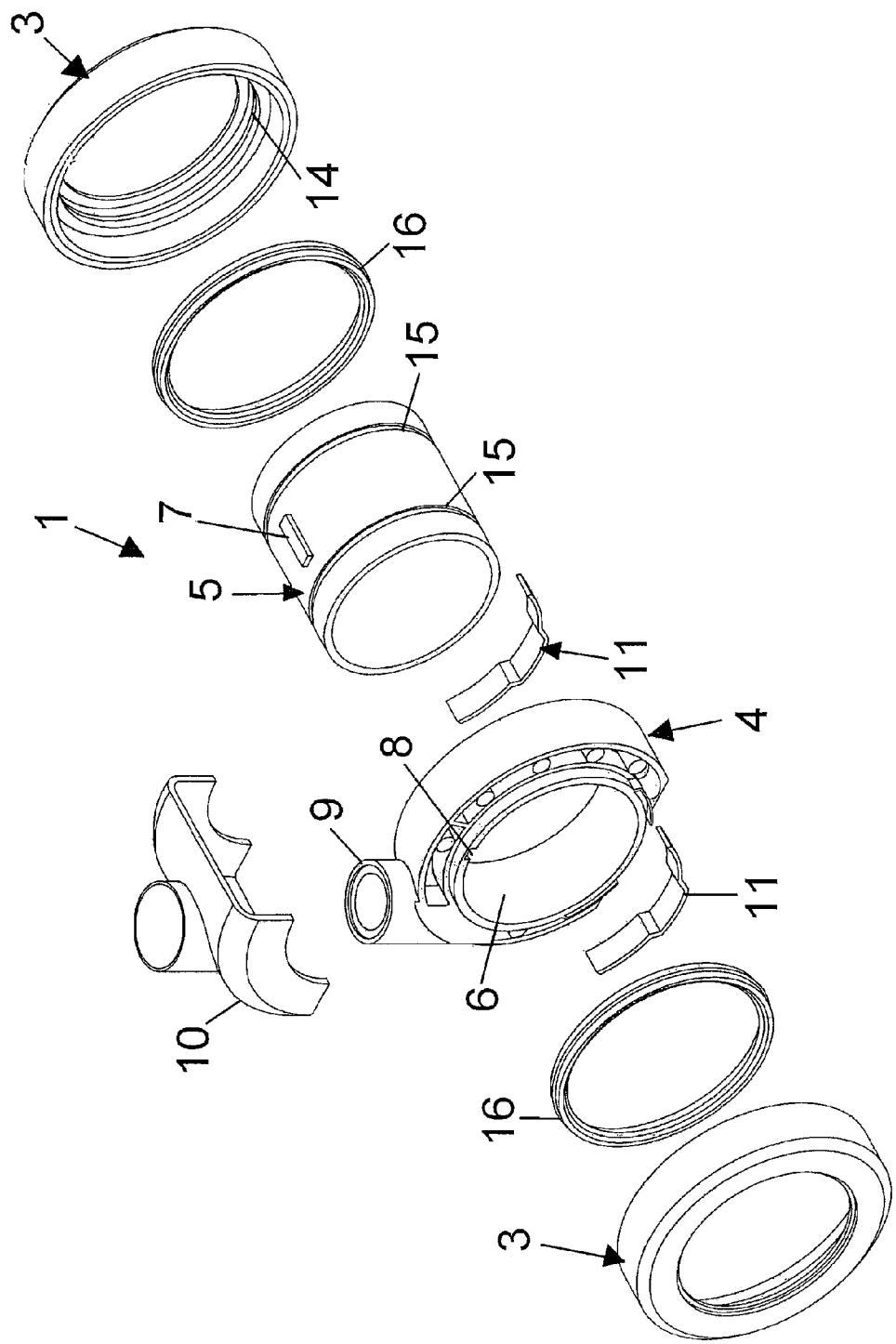
FIG. 1 is an exploded perspective view showing all the component elements of the castor wheel construction according to the present invention.
Figure 2:
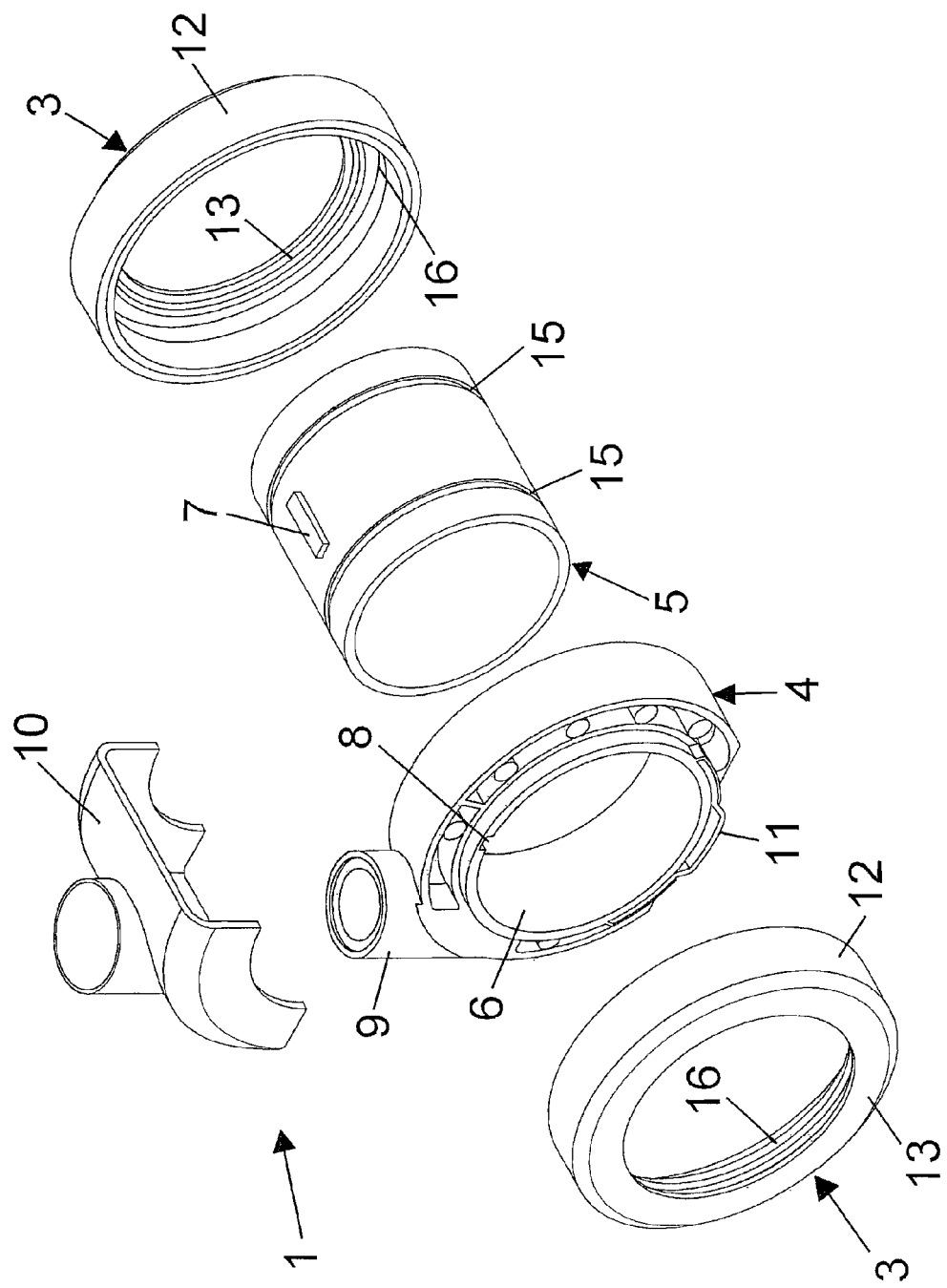
FIG. 2 is a further perspective view, on an enlarged scale, showing the castor wheel construction in a partially exploded condition thereof.
Figure 3:
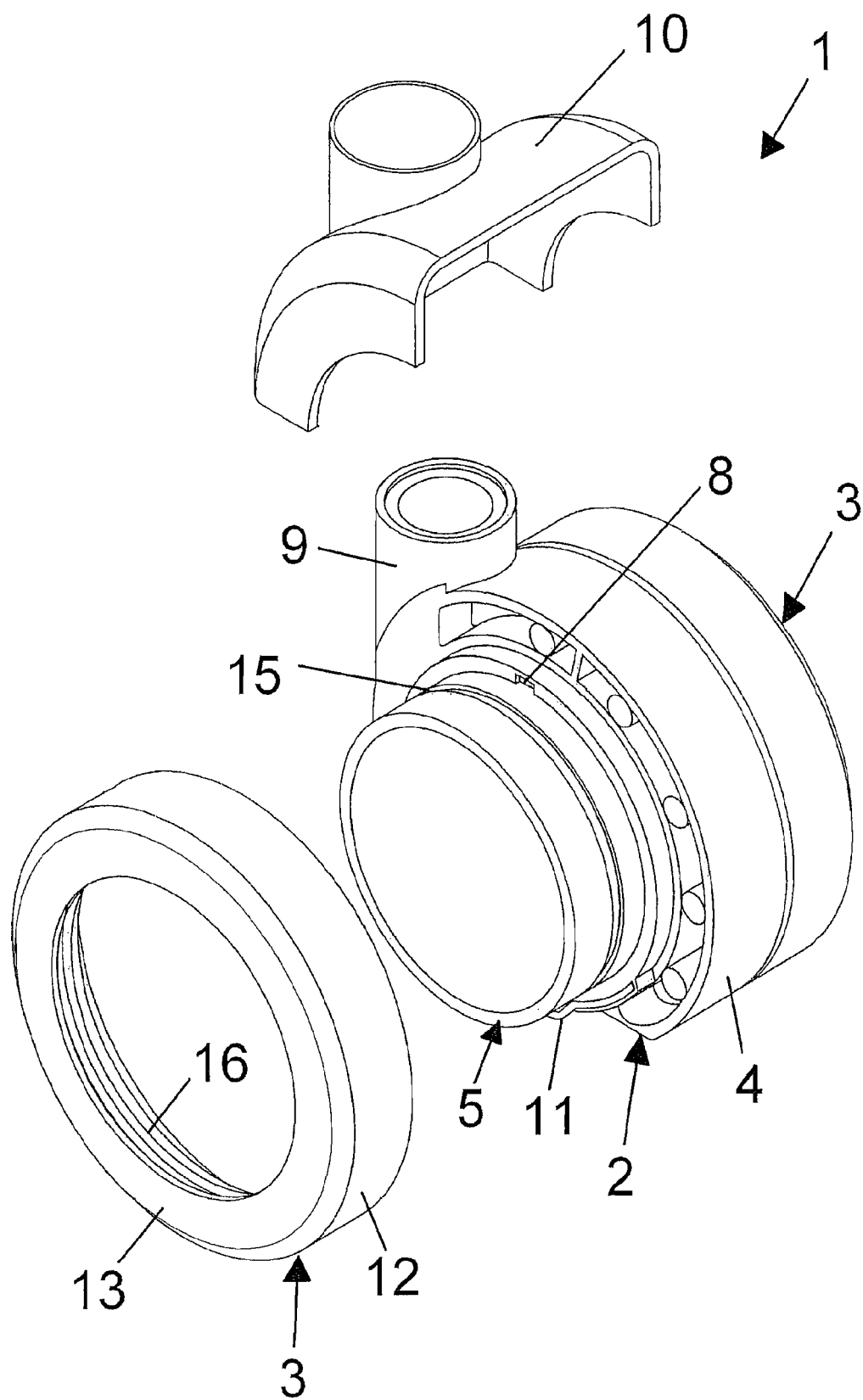
FIG. 3 is yet another perspective view showing the castor wheel construction in a partially assembled condition thereof.
Figure 4:
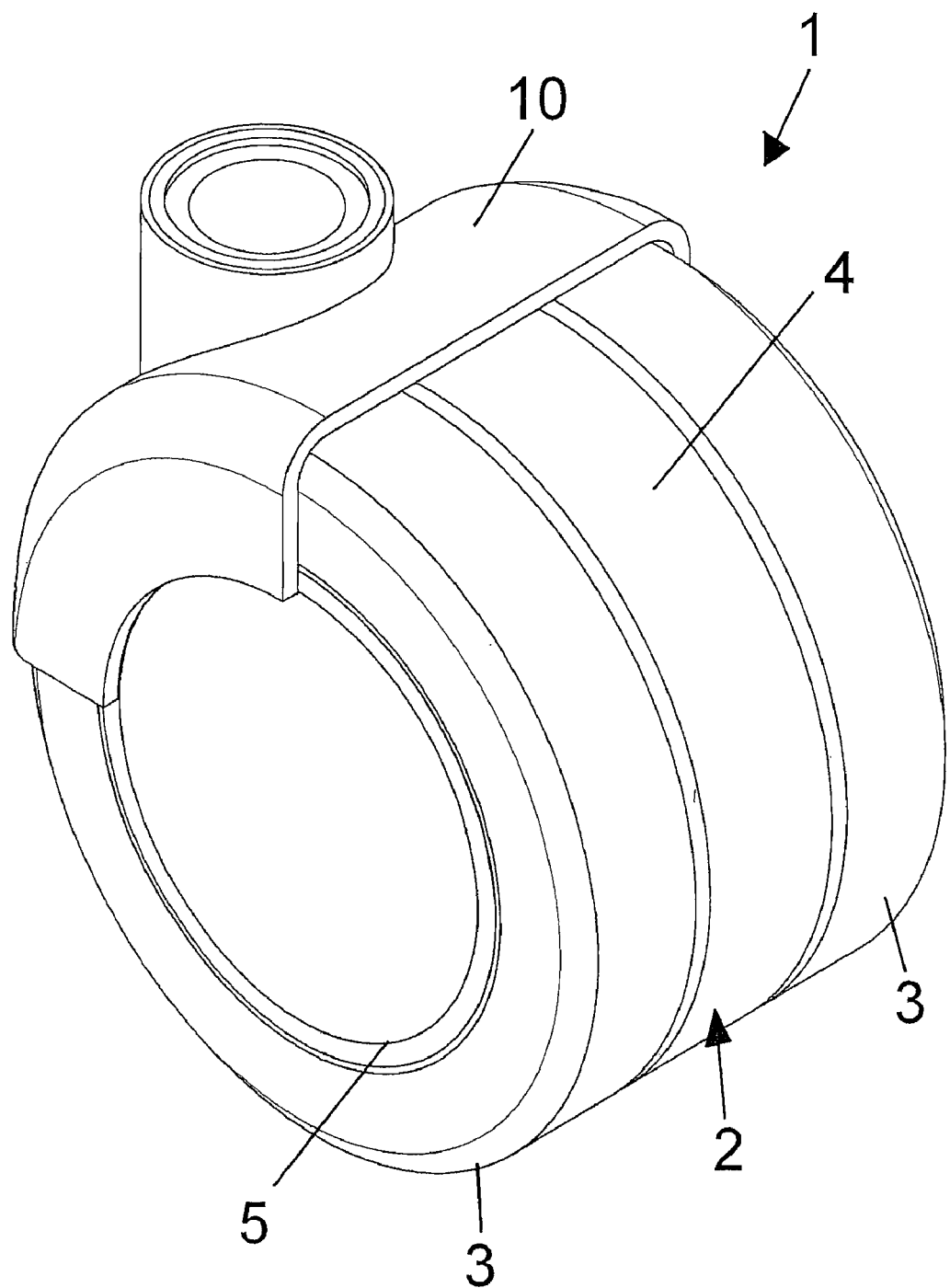
FIG. 4 is yet another perspective view of the castor wheel construction in a use fully assembled condition thereof.
Figure 5:
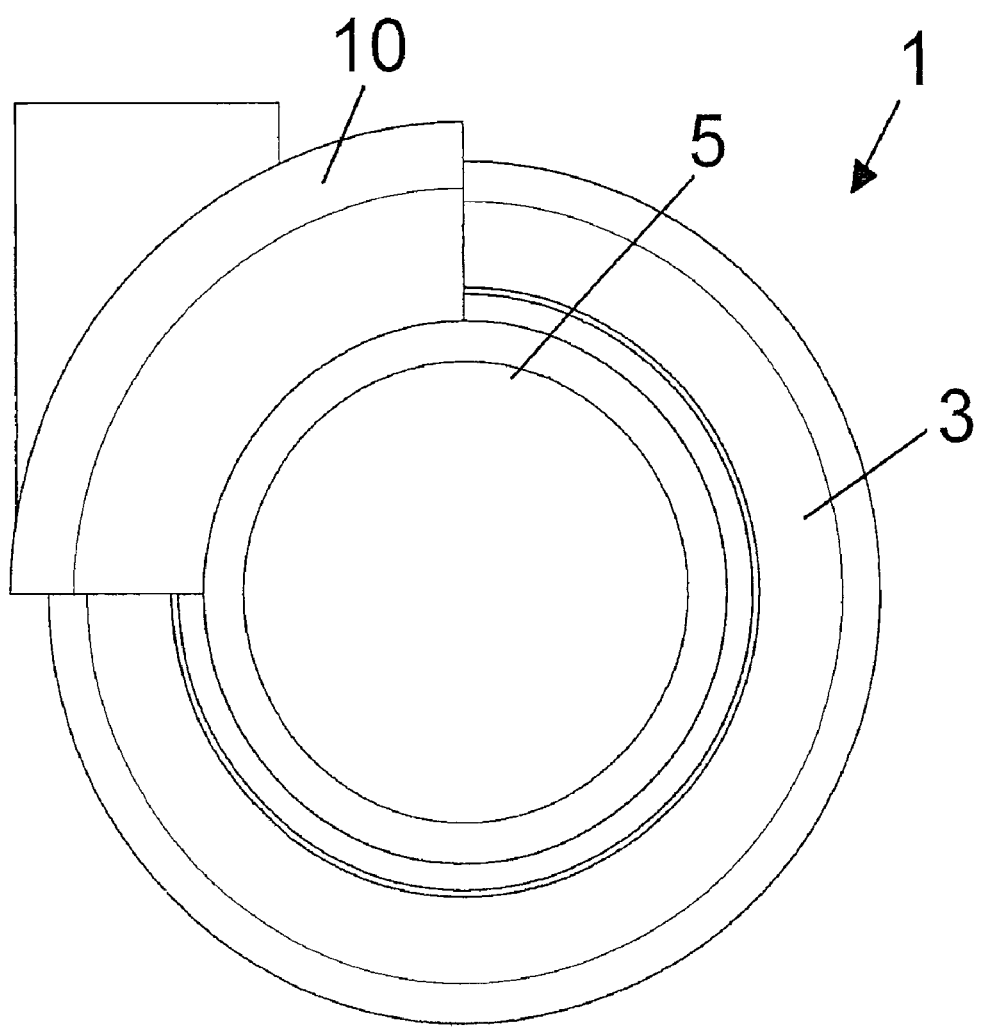
FIG. 5 is an elevation view of the fully assembled castor wheel construction.
Figure 6:
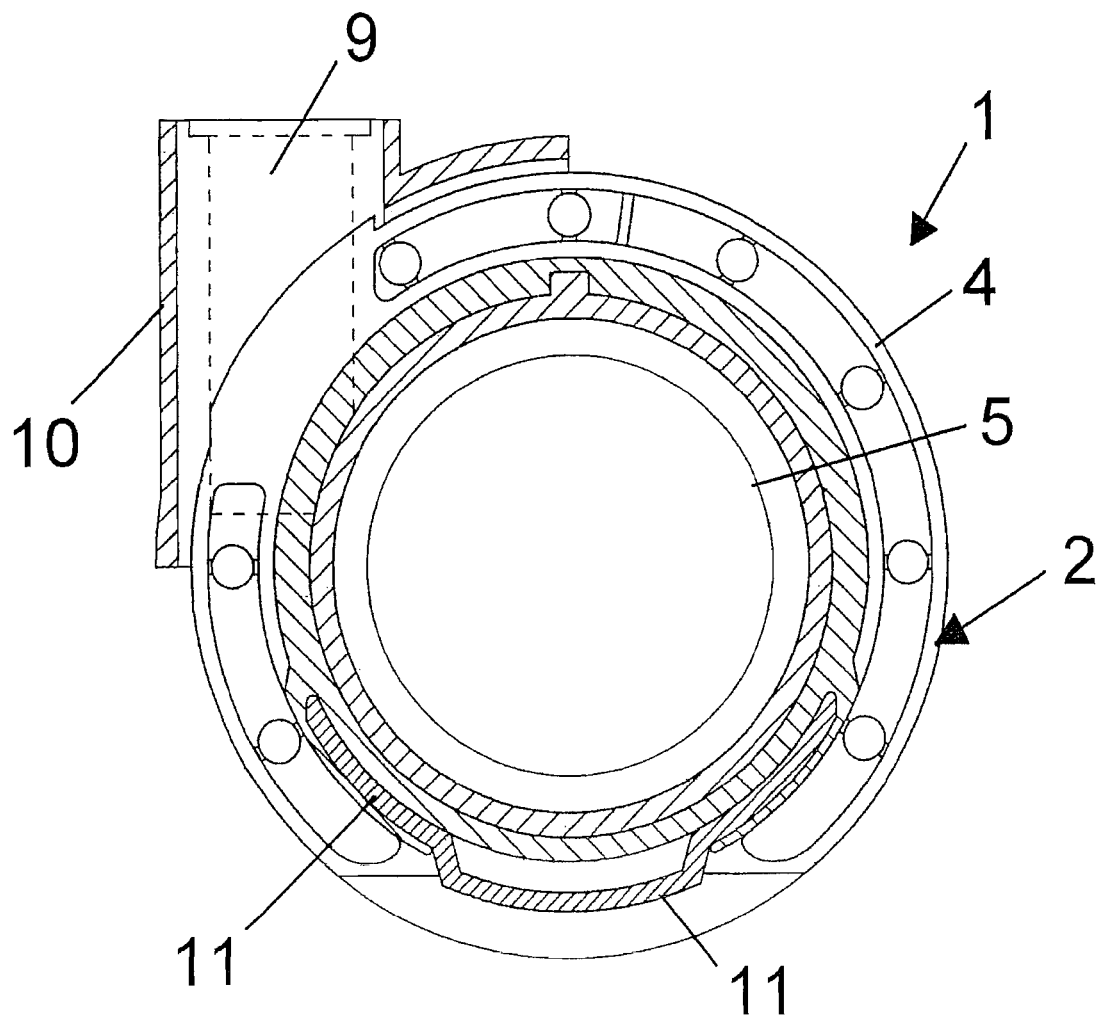
FIG. 6 is a cross-sectional view of the wheel construction according to the present invention.

With reference to the number references of the above mentioned figures, the castor wheel construction according to the present invention, generally indicated by the reference number 1, comprises a castor wheel hub 2 supporting a pair of wheels 3.

The castor wheel hub 2 comprises an annular support 4 supporting a cylinder 5 having two end portions thereon the two wheels 3 are mounted.

The annular support 4 comprises moreover a cylindric recess or seat 6 receiving the cylinder 5 which is advantageously provided with a ridge portion 7, which may be fixedly engaged in a longitudinal seat or recess 8 formed on the surface of the cylindric seat for preventing the cylinder 5 from turning with respect to the annular support.

Said annular support 4 comprises moreover a vertical attachment portion 9, for receiving a peg or other like element, integral with the furniture piece or other component the castor wheel construction must be coupled to.

The peg, not shown in the figures, may turn inside the vertical attachment portion 9, to allow the overall system to rotate about a vertical axis, in a per se known manner.

The castor wheel construction comprises moreover a fender-like covering element 10, applied to the castor wheel hub 2 at said vertical attachment portion 9 of said hub for supporting said covering element 10.

The annular supporting element 2 also comprises a pair of seats therein respective elastic blade elements 11, each forming a spring brake for a said respective wheel 3, are partially engaged.

Each wheel 3 comprises a cylindric portion 12, operating as a wheel tread, coupled to a flange portion 13.

The wheel may be made into two pieces: a wheel outer portion, made of a softer material, for operating as a tread, and an inner portion, made of a harder material, for operating as a support.

The inner portion comprises an annular slot 14 housing at least partially therein, a ring element 16 in turn partially engaging a like annular slot 15 formed on each side of said cylinder 5.

Each said ring element 16 is a bushing element also operating as a restraining element for a respective said wheel.

The castor wheel construction according to the present invention is assembled by at first engaging said cylinder 5 in said annular supporting element cylindric seat 6 of said annular support 4.

Then, the bushings 16 are applied to the inner annular seats of said wheels 3 and said coupled bushings being clamped to respective cylinders or portions 5 projecting from said annular supporting or support element 4, by resiliently deforming the components.

If provided, optional ring brake elements 11 are applied to the castor wheel hub before coupling or clamping the wheel thereto.

Finally, the fender-like element 10 is applied thereby completing the castor wheel construction.

All the castor wheel construction components are preferably made of different plastic materials selected to achieve desired functions.

For example, as above mentioned, the wheels comprise a softer outer portion, for operating as a wheel tread, and a harder material inner portion similar to the material forming all the other components.

The bushings 16 may also comprise a self-lubricating plastic material.

It has been found that the invention fully achieves the intended aim and objects.

In fact, the invention has provided a castor wheel construction which is structurally very strong and in the meanwhile may be easily and quickly made.

In fact, the inventive castor wheel construction comprises a very small number of components, which may be assembled without the need of using specifically designed assembling tools and apparatus.

Moreover, the inventive castor wheel construction has a very small size and is aesthetically very pleasant.

While the invention has been disclosed with reference to specific embodiments thereof, it should be apparent that the disclosed embodiments are susceptible to several modifications and variations all coming within the scope of the invention.

The invention claimed is:

1. A castor wheel construction for a furniture piece, comprising a hub including an annular supporting element supporting a cylinder having two end portions, each of said two end portions having a wheel mounted, thereon, said annular supporting element also including a vertical attachment portion for receiving a peg element integral with said furniture piece to allow said castor wheel construction to turn about a vertical axis, each said wheel comprising a cylindric portion operating as a tread, coupled to a flange portion, said annular supporting element comprising a cylindric seat that engages said cylinder, said cylinder comprising a cylinder ridge portion that is fixedly engaged in a longitudinal seat formed on a surface of said cylindric seat for preventing said cylinder from rotating with respect to said annular supporting element, said castor wheel construction having a fender-like covering element, applied to said vertical attachment portion of said hub for supporting said fender-like covering element, wherein said annular supporting element also comprises a pair of seats where each seat has therein, an elastic blade element that forms a spring brake for each of said wheels.

2. A castor wheel construction, according to claim 1, said wheel being a two portion wheel, with an outer tread portion made of a softer plastics material, and an inner support portion made of a harder material, wherein said inner portion comprises an annular slot housing therein a ring element in turn engaging in a like annular slot formed on each side of said cylinder.

3. A castor wheel construction, according to claim 2, wherein said ring element is a bushing element that operates as a restraining element for said wheel.

* * * * *